A. SIMKO.
MOTOR STREET CLEANER.
APPLICATION FILED AUG. 6, 1917.
1,275,322.
Patented Aug. 13, 1918.
2 SHEETS—SHEET 1.
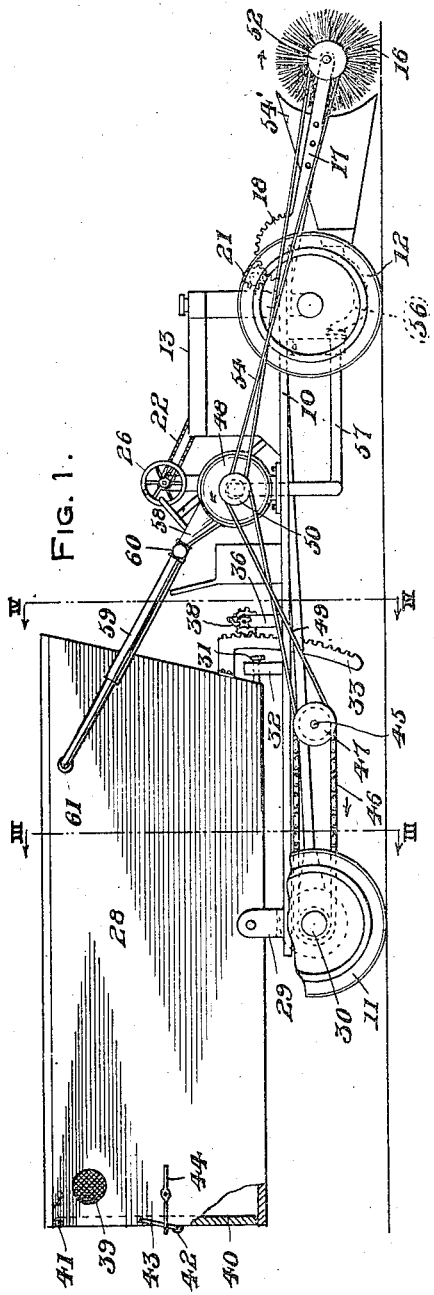
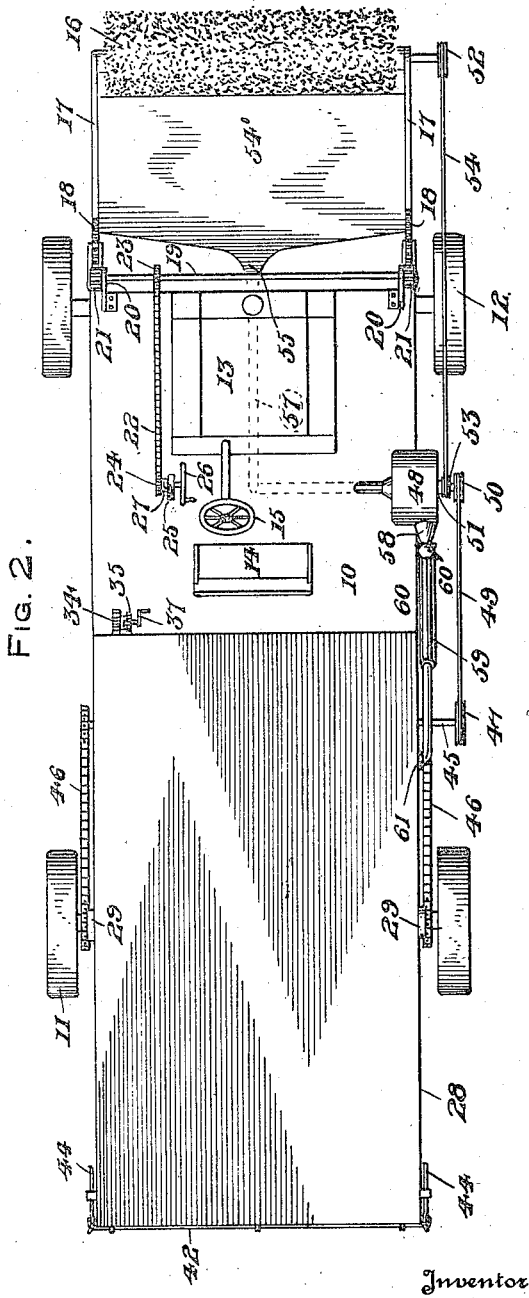
Inventor
A. Simko

A. SIMKO.
MOTOR STREET CLEANER.
APPLICATION FILED AUG. 6, 1917.

1,275,322.

Patented Aug. 13, 1918.
2 SHEETS—SHEET 2.

Inventor
A. Simko

By A. M. Ibreson
Attorney

UNITED STATES PATENT OFFICE.

ANDREW SIMKO, OF PASSAIC, NEW JERSEY.

MOTOR STREET-CLEANER.

1,275,322.          Specification of Letters Patent.     Patented Aug. 13, 1918.

Application filed August 6, 1917. Serial No. 184,646.

*To all whom it may concern:*

Be it known that I, ANDREW SIMKO, a citizen of the United States of America, residing at Passaic, in the county of Passaic and State of New Jersey, have invented certain new and useful Improvements in Motor Street-Cleaners, of which the following is a specification.

This invention relates to certain new and useful improvements in motor street cleaners.

The primary object of the invention is the provision of a motor driven device adapted for cleaning streets during the passage of the device thereover, the arrangement being such as to sweep and transfer the sweepings to a dumping receptacle, the latter being adapted to be emptied when filled during the continued operation of the sweeper.

A further object of the invention is the provision of a street cleaner in which the forward driving of the device effects a collection of sweepings under the control of the operator, the sweepings being readily dumped when desired without dislocating any of the operative connections.

In the drawings forming a part of this application and in which like designating characters refer to corresponding parts throughout the several views, Figure 1 is a side elevation of the device partially broken away.

Fig. 2 is a top plan view thereof.

Figure 3:
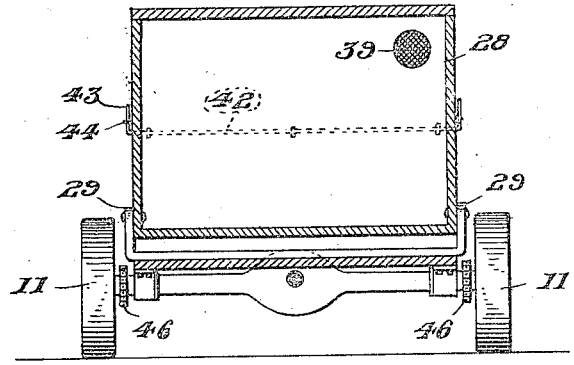
Figs. 3 and 4 are vertical sectional views taken upon lines III—III and IV—IV respectively of Fig. 1.
Figure 4:
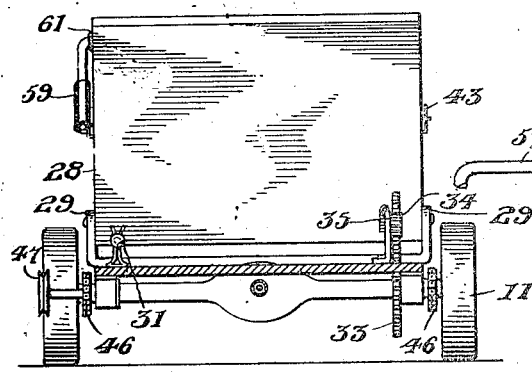
Figure 5:
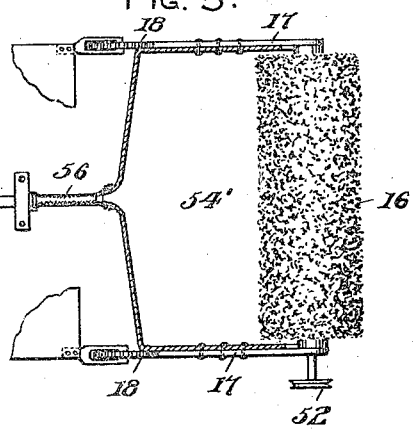
Fig. 5 is a horizontal detail sectional view through the forward portion of the device and Fig. 6 is an enlarged elevational fragmentary detail view, partly in section, of the forward portion of the device.
Figure 6:
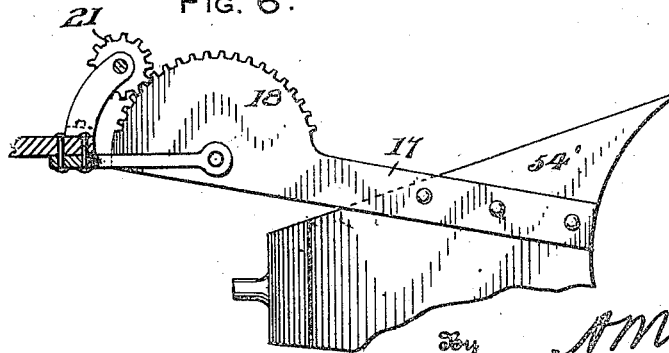

Referring more in detail to the drawings, a vehicle is provided having a platform 10, rear traction wheels 11, forward steering traction wheels 12 and a hood 13 adapted for covering a driving motor for the vehicle while a driver's seat 14 is arranged upon the platform adjacent the steering wheel 15.

A rotary brush or sweeper 16 is trunnioned in forwardly projecting arms 17 pivotally carried by brackets 18 at the forward corners of the platform 10, the said arms having rearwardly arranged substantially semi-circular toothed racks 18'. A transverse shaft 19 is journaled in brackets 20 carried by the platform 10 and pinions 21 secured on said shaft are in constant mesh with the racks 18' while a sprocket chain 22 passes over sprocket wheels 23 and 24 secured on the shaft 19 and a stub-shaft 25 respectively whereby a turning of a wheel 26 carried by said stub-shaft will elevate or lower the arms 17 and the brush 16 as desired. A spring-pressed latch 27 is provided for the stub-shaft 25 for maintaining the brush 16 in its adjusted elevated positions.

A box 28, provided to receive the sweepings, is pivoted within a frame 29 carried by the platform 10 substantially over the rear axle 30 of the vehicle. An arm 31 forwardly projecting from the box is grasped by a U-shaped spring clamp 32 when the box is in its normal horizontal position. An arcuate rack 33 projects forwardly and downwardly from the box 28 and meshes with a gear 34 carried by the stub-shaft 35 journaled in a post 36 and on which is mounted an operating crank 37 by means of which the rack 33 may be elevated and lowered as desired for dumping the box 28. The pawl and ratchet mechanism 38 is carried by the post 36 for preventing the upward movement of the rack 33 and the tilting of the box until the pawl is released.

Screened ventilating openings 39 may be arranged in the sides of the box 28 if desired. A swinging rear door 40 is provided for the box, the door being hinged at the top thereof as at 41, while a retaining bar 42 which is journaled upon the outer side of the door 40 has projecting ends 43 adapted to be sprung over resilient catches 44 carried by the opposite sides of the box 28.

A shaft 45 is journaled transversely beneath the platform 10 and is adapted to be driven from the rear axle 30 by means of sprocket chains 46 while a pulley 47 upon the shaft 45 is adapted to operate a circulating fan 48, a belt 49 being arranged between the pulley 47 and a pulley 50 upon the fan shaft 51. The brush 16 is arranged with a driving pulley 52 operatively connected to a pulley 53 upon the fan shaft 51 by means of a belt 54.

A hopper shaped receiver 54' is secured to the arms 17 and has an outlet nozzle 55 at its rear end connected by means of a flexible hose 56 with the inlet pipe 57 of the fan 48. The fan outlet 58 is connected to the box 28 by means of a telescoping pipe connection 59 having a hinged connection 60 with the outlet 58 and a swiveled connection 61 with the box 28. The complete operation of the device will be apparent from this detailed description thereof, it being seen that the forward movement of the vehicle and the turning of the traction wheels 11 and axle 30 operates the fan 48 and the brush 16 while the latter is maintained in its lowered sweeping position by the proper adjustment of the latch 27. The sweepings from the brush 16 are thrown rearwardly into the receiver 54' and by reason of the impulse or draft through the fan 48, the sweepings are sucked upwardly through the fan, out of the outlet 58 thereof and through the connecting pipe 59 into the box 28. When the box has been filled, the door 40 is unlocked. The crank 37 is then turned which forcibly elevates the rack 33, releases the member 31 from the member 32 and, by reason of the consequent tilting of the box, the contents of the box 28 are caused to flow rearwardly out of the box, the weight of the contents causing the door 40 to open. It is to be understood that the pipe 59 need not be disconnected during the dumping operation, because, by reason of its telescopic structure and its flexible connections, the various connections will not have to be disturbed when the box is tilted.

What I claim as new is:—

1. In combination with a vehicle having a platform, a frame upon the rear portion of said platform, a collection box pivoted in said frame being normally horizontally arranged, a sweeping brush, a receiver for the sweepings arranged adjacent the brush, a fan operatively connected to the receiver, a telescopic pipe having swiveled connections with the box and hinged connections with the outlet of said fan and means for simultaneously operating the fan and brush.

2. In combination with a vehicle having a platform, a fan and a tiltably mounted dumping collection box upon the platform, telescopic pipe connections between the box and the fan having swiveled connection with the box and hinged connection with the fan, a sweeping brush operatively associated with the inlet of the fan, and means for operating the fan and the brush.

In testimony whereof I affix my signature.

ANDREW SIMKO.